United States Patent Office 3,458,526
Patented July 29, 1969

3,458,526
CERTAIN 2-AMINO-4,5-BIS(p-METHOXY-PHENYL)THIAZOLES
Daniel Lednicer, Portage, Mich., assignor to The Upjohn Company, Kalamazoo, Mich., a corporation of Delaware
No Drawing. Filed Sept. 26, 1966, Ser. No. 581,747
Int. Cl. C07d 91/34, 91/30
U.S. Cl. 260—306.8                  13 Claims

ABSTRACT OF THE DISCLOSURE

There are disclosed 2-amino- and various 2-hydrocarbylamino- and 2-acylamino-4, 5-dianisylthiazoles, 2-alkyl- and 2-phenylthiazoles, and 4,5-dianisyl-2-thiazoleacetates, as well as processes for making them by the reaction of α-bromodesoxyanisoin with the appropriate thioamide or thioamide analogues. These compounds are useful for treating various inflammatory conditions and in certain antiviral applications.

---

The present invention is directed to novel compounds and is more particularly concerned with certain 2-substituted - 4,5 - dianisylthiazoles [2-substituted-4,5-bis(p-methoxyphenyl)thiazoles], certain novel intermediates therefor and the production thereof.

The novel products, intermediates therefor and process thereof can be illustratively represented by the following sequence of Formulae A and B:

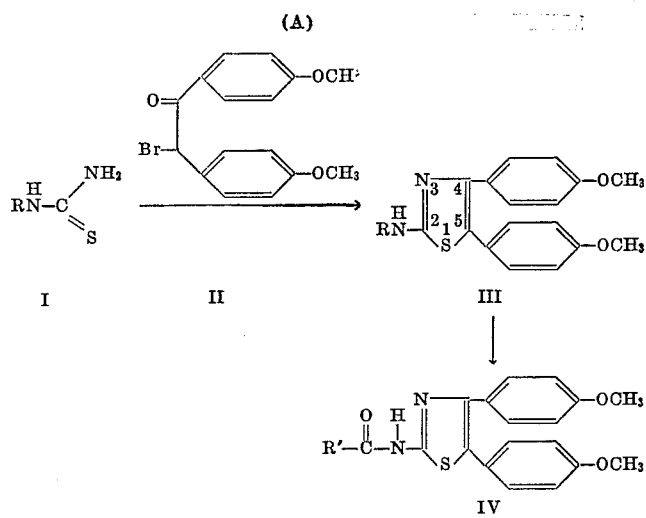

wherein R is selected from the group consisting of hydrogen; alkyl having from 1 to 10 carbon atoms, inclusive; lower alkenyl having from 3 to 6 carbon atoms, inclusive; phenyl of the formula:

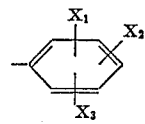

in which $X_1$, $X_2$ and $X_3$ are substituents selected from the group consisting of hydrogen, halogen, alkyl and alkoxy having from 1 to 3 carbon atoms, inclusive; carboxy, and carbalkoxy having from 2 to 4 carbon atoms, inclusive; benzyl in which the phenyl group is defined as above; and acyl of the formula R'CO— in which R' is selected from the group consisting of alkyl having from 1 to 10 carbon atoms, inclusive, and phenyl defined as above;

and (B)

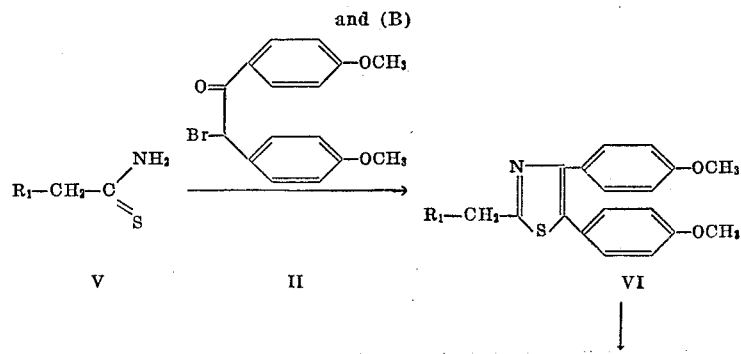

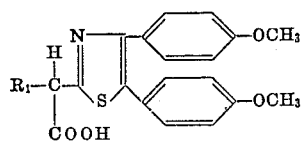
VIII

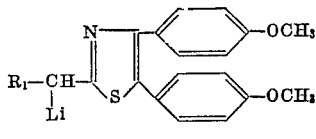
VII

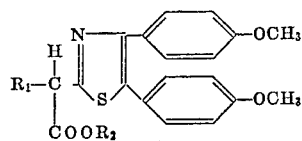
IX wherein $R_1$ is selected from the group consisting of hydrogen, lower alkyl having up to and including 4 carbon atoms, and phenyl, and $R_2$ is alkyl having up to and including 2 carbon atoms.

The alkyl group containing from 1 to 10 carbon atoms, inclusive, as used in the above formulae, comprises the members methyl, ethyl, propyl, butyl, pentyl, hexyl, heptyl, octyl, nonyl, decyl and the branched isomers thereof. Alkyl groups having less carbon atoms comprise the early members of the same series.

The lower alkenyl in the formulae above comprises allyl, 1-methylallyl, 2-methylallyl (methallyl), 2-butenyl (crotyl), 3-butenyl, 1,2-dimethylallyl, 2-ethylallyl, 2-methyl-2-butenyl, 3-pentenyl, 4-methyl-2-pentenyl, 2-hexenyl, and the like.

The term "halogen" used as substituent in the phenyl group of phenyl, benzyl and benzoyl substituents comprises fluorine chlorine, bromine and iodine.

The term "alkoxy having from 1 to 3 carbon atoms, inclusive" comprises methoxy, ethoxy, propoxy and isopropoxy.

The term "carbalkoxy having from 2 to 4 carbon atoms, inclusive" comprises carbomethoxy, carbethoxy, carbopropoxy, carboisopropoxy, carbobutoxy, and the like.

The term "acyl of the formula R'CO— in which R' is selected from the group consisting of alkyl having from 1 to 10 carbon atoms, inclusive, and phenyl defined as above" comprises acetyl, propionyl, butyryl, valeryl, hexanoyl, heptanoyl, octanoyl, nonanoyl, decanoyl, undecanoyl, benzoyl, p-chlorobenzoyl, 2,4-dichlorobenzoyl, o-fluorobenzoyl, m-iodobenzoyl, 2,4-diiodobenzoyl, o-bromobenzoyl, p-methoxybenzoyl, o-ethoxybenzoyl, m-methoxybenzoyl, m-propoxybenzoyl, p-isopropoxybenzoyl, 1,3,5-trimethylbenzoyl, m-ethylbenzoyl, p-propylbenzoyl, m-methylbenzoyl, o-methylbenzoyl, m-isopropylbenzoyl, and the like.

The process (A) of the present invention comprises: heating a solution of α-bromodesoxyanisoin (II) with a selected thiourea (I) to give a novel 2-(amino-substituted)-4,5-dianisylthiazole (III); and treating, if desired, a compound of Formula III (when R=H) with an acyl halide in which the acyl group is of the formula:

defined as above, and the halogen of the halide is selected from the group consisting of chlorine and bromine, to give a novel compound of Formula IV.

The process (B) of this invention comprises: heating a solution of α-bromodesoxyanisoin (II) with a thioamide (V) to give the corresponding 2-alkyl- or 2-benzyl-4,5-dianisylthiazole (VI); treating (VI) with a lithium alkyl to give the corresponding lithium salt (VII); treating (VII) with carbon dioxide to obtain the corresponding 4,5-dianisyl-2-thiazoleacetic acid (VIII), which can be esterified in conventional manner with diazomethane or diazoethane to give the corresponding alkyl 4,5-dianisyl-2-thiazoleacetate (IX).

The novel compounds of the present invention, III, IV, VI and IX, possess high anti-inflammatory activity frequently exceeding that of phenylbutazone. Illustratively, 2-phenylamino-4,5-dianisylthiazole has approximately five times the activity of phenylbutazone (measured in rats). These compounds, III, IV, VI and IX, are thus very well suited for the treatment of inflammatory diseasees and inflammations of non-bacterial origin, such as contact dermatitis, allergic inflammations and also mastitis in cattle. The compounds of Formulae III, IV, VI and IX, have, moreover, anti-viral activity and can be used for cleaning laboratory glassware contaminated by virus, as well as for destroying infiltration of viral phages into colonies of bacteria raised for experimental purposes or used for specific chemical tasks.

The novel compounds of Formulae VII and VIII are intermediates for the production of the compounds of Formula IX.

The thioureas used in this invention are known to the art, or are produced as shown in the preparations by the general process of treating a selected amine with carbon disulfide in the presence of a base like triethylamine, followed by treatment with ehtyl chloroformate, and treating the thus-obtained isothiocyanate with ammonia to give the corresponding thiourea.

In carrying out the process of the present invention, α-bromodesoxyanisoin (II) together with the selected thiourea (I) or thioamide (V) is heated in an inert organic solvent such as methanol, ethanol, propanol, acetonitrile and the like. In the preferred embodiment of this invention, the reactants are used in equimolecular quantities, and the reaction, when carried out at reflux temperature, needs for completion between 1 and 5 hours. It is possible, but not advantageous, to carry out the reaction at lower temperatures within longer reaction periods. After the reaction is terminated, the desired compound of Formula III or VI is recovered in conventional manner such as by removing the solvent by distillation or precipitating the product by diluting the solvent with water or with another solvent in which the desired product is insoluble. The compound can be purified by crystallization or chromatography.

In the event a 4,5-dianisyl-2-thiazoleacetic acid (VIII) is desired, a 2-alkyl- or 2-(phenylalkyl)-4,5-dianisylthiazole (VI) is reacted with butyllithium at low temperatures in an inert organic solvent. Generally the 2-alkyl- or 2-(phenylalkyl)-4,5-dianisylthiazole is in solution, e.g., in tetrahydrofuran, ether, dibutyl ether, or the like, whereas the butyllithium is in a hydrocarbon solvent which does not solidify at the temperature of the reaction (—25 to —80° C.) like petroleum ether, n-pentane or the like.

The thus-obtained lithium salt of 2-alkyl- or 2-benzyl-4,5-dianisylthiazole (VII) is reacted with carbon dioxide in an inert solvent such as tetrahydrofuran, ether, dioxane or the like. The resulting lithium 4,5-dianisyl-2-thiazoleacetate is treated with aqueous acid followed by extraction with a water-immiscible solvent such as ether, methylene chloride or the like, and evaporating the solvent. The thus-obtained 4,5-dianisyl-2-thiazoleacetic acid (VIII) can be esterified in conventional manner with diazomethane or diazoethane in ether solution to give a more stable methyl or ethyl 4,5-dianisyl-2-thiazoleacetate (IX).

The following examples and preparations are illustrative of the products and processes of this invention, but are not to be construed as limiting.

PREPARATION 1

Decylthiourea

A solution of 20 g. of decylamine, 12.95 g. of triethylamine and 110 ml. of methylene chloride was cooled to $-10°$ C. under continuous stirring. To this solution was added, over a period of 1 hour, a solution of 7.7 ml. of carbon disulfide in 45 ml. of chloroform. The mixture was allowed to warm to 15° C. and it was then again cooled in ice. To this mixture was then added 13.9 g. of ethyl chloroformate in 23 ml. of chloroform at such a rate as to keep the temperature below 4° C. The reaction mixture was then stirred for 20 minutes at room temperature, again cooled in ice, and treated with 12.95 g. of triethylamine in 23 ml. of chloroform over a period of 45 minutes. Following 40 minutes of stirring at room temperature, the mixture was washed first with ice-water, then cold 2.5 N hydrochloric acid, ice water and aqueous sodium bicarbonate solution. The organic layer was taken to dryness and the residual oil was distilled at 0.25 mm. There was obtained 21.34 g. of decyl isothiocyanate of boiling point 99–103.5° C./0.25 mm.

Into a solution of the 21.34 g. of decyl isothiocyanate in 200 ml. of tetrahydrofuran was passed gaseous ammonia during a period of 30 minutes. The solution was then heated at reflux for 2 hours and taken to dryness in vacuo. The residue was recrystallized twice from methanol to give 7.19 g. of decylthiourea of melting point 94–99° C.

*Analysis.*—Calcd. for $C_{11}H_{24}N_2S$: C, 61.05; H, 11.18; N, 12.95. Found: C, 61.20; H, 11.28; N, 12.81.

PREPARATION 2

Anisylthiourea

Thirty grams of p-anisidine (p-methoxyaniline) was reacted as in Preparation 1 with carbon disulfide, triethylamine and ethyl chloroforamate, and the crude p-methoxyphenyl isothiocyanate thus obtained was twice distilled (once at 1.3 mm. and once at 0.45 mm.) to give 13.0 g. of pure p-methoxyphenyl isothiocyanate of boiling point 86–88° C./0.45 mm.

Into a solution of the p-methoxyphenyl isothiocyanate in 65 ml. of absolute ethanol was passed gaseous ammonia for 30 minutes; a solid precipitated out of solution. The mixture was allowed to stand overnight at room temperature and the solid collected on a filter. Recrystallization of the crude anisylthiourea from methanol gave 10.30 g. of anisylthiourea of melting point 208–210.5° C.

*Analysis.*—Calcd. for $C_8H_{10}N_2OS$: C, 52.72; H, 5.53; N, 15.38. Found: C, 53.28; H, 5.63; N, 15.56.

PREPARATION 3 p-Carbethoxyphenylthiourea (A) p-CARBETHOXYPHENYL ISOTHIOCYANATE

A solution of 4 ml. of carbon disulfide in 23 ml. of chloroform was added to a well stirred solution of 10 g. of ethyl p-aminobenzoate and 6.74 g. of triethylamine in 57 ml. of methylene chloride, at $-10°$ C., and over a period of 40 minutes. After standing at about 5 to 10° C. for 4½ days, a solution of 6.97 g. of ethyl chloroformate in 12 ml. of chloroform was added at a rate to keep the temperature below 4° C. The mixture was then allowed to stir at room temperature for 20 minutes. The mixture was again cooled in ice and a solution of 6.73 g. of triethylamine in 12 ml. of chloroform was added. The reaction mixture was then allowed to warm to room temperature and stirred for 40 minutes, then washed with ice water, cold 2.5 N hydrochloric acid, ice water and aqueous sodium bicarbonate solution. The organic layer was separated and then evaporated to give a solid residue which was chromatographed with a mixture of 98% Skellysolve B hexanes and 2% acetone over 600 ml. of Florisil (anhydrous magnesium silicate) to give 0.40 g. of p-carbethoxyphenyl isothiocyanate as oily crystals.

(B) p-CARBETHOXYPHENYLTHIOUREA

A solution of 0.40 g. of p-carbethoxyphenyl isothiocyanate in 3 ml. of tetrahydrofuran was treated with a solution of 7.3 ml. of 0.26 N ammonium hydroxide in tetrahydrofuran. Following 2 hours standing at room temperature, the solution was evaporated to dryness and the resulting residual crystalline solid was recrystallized twice from acetone-Skellysolve B hexanes to yield p-carbethoxyphenylthiourea of melting point 149–151° C.

*Analysis.*—Calcd. for $C_{10}H_{12}N_2O_2S$: C, 53.55; H, 5.40; N, 12.49; S, 14.29. Found: C, 53.63; H, 5.62; N, 13.15; S, 13.86.

PREPARATION 4 p-Chlorobenzylthiourea

In the manner given in Preparation 1, 20 g. of p-chlorobenzylamine was reacted with carbon disulfide, triethylamine, and ethyl chloroformate to give upon distillation 14.5 g. of p-chlorophenyl isothiocyanate of boiling point 106–107.5° C. at 0.35 mm.

This p-chlorobenzyl isothiocyanate was reacted with ammonia in tetrahydrofuran to give, after recrystallization from acetone-Skellysolve B hexanes, 13.45 g. of p-chlorobenzylthiourea of melting point 136–139° C.

*Analysis.*—Calcd. for $C_8H_9ClN_2S$: C, 47.87; H, 4.52; N, 13.96; S, 15.97. Found: C, 47.88; H, 4.58; N, 13.69; S, 15.82.

In the manner given in Preparation 1, other alkyl-, alkenyl-, phenyl-, benzyl-, and phenyl- and benzyl-, substituted by halogen, alkyl, alkoxy, carboxy and carbalkoxy, thioureas can be obtained by reacting the corresponding amines with carbon disulfide in the presence of triethylamine and thereupon with ethyl chloroformate to give the corresponding isothiocyanate which after treatment with ammonia gives the desired substituted thiourea. Representative thioureas, thus produced, include: propylthiourea, butylthiourea, isobutylthiourea, pentylthiourea, hexylthiourea, octylthiourea, nonylthiourea, methallylthiourea, crotylthiourea, (2-hexenyl)-thiourea, p-fluorobenzylthiourea, 2,4-diiodobenzylthiourea, phenylthiourea, isopropylthiourea, benzylthiourea, p-bromophenylthiourea, 2,4,6-tribromophenylthiourea, p-chlorophenylthiourea, p-iodophenylthiourea, m-fluorophenylthiourea, m-fluorobenzylthiourea, p-fluorobenzylthiourea, o-chlorobenzylthiourea, p-ethoxyphenylthiourea, p-propoxybenzylthiourea, and the like.

EXAMPLE 1

2-amino-4,5-dianisylthiazole

A solution of 10.0 g. of α-bromodesoxyanisoin and 2.30 g. of thiourea in 150 ml. of absolute ethanol was heated at reflux temperature for a period of 3½ hours. After the bulk of the solvent was removed in vacuo and the residue treated with water, a solid precipitated which was recrystallized from aqueous acetone to give 7.66 g. of 2-amino-4,5-dianisylthiazole of melting point 208 to 211° C.

A small sample was recrystallized from the same solvent to give pure 2-amino-4,5-dianisylthiazole of melting point 209–210.5° C.

*Analysis.*—Calcd. for $C_{17}H_{16}N_2O_2S$: C, 65.36; H, 5.16; N, 8.97. Found: C, 65.39; H, 5.24; N, 9.05.

EXAMPLE 2

2-butylamino-4,5-dianisylthiazole

A solution of 1.32 g. of butylthiourea and 3.35 g. of α-bromodesoxyanisoin in 50 ml. of acetonitrile was heated at reflux for a period of 1.5 hours. The solution was allowed to cool and the solvent removed in vacuo. The remaining solid residue was dissolved in ether-methylene chloride and the solution was washed first with aqueous sodium bicarbonate solution, then water followed by brine. The solution was taken to dryness and the resulting solid crystallized twice from methylene chloridemethanol to give 2.72 g. of 2-butylamino-4,5-dianisylthiazole of melting point 155–158° C.

Analysis.—Calcd. for $C_{21}H_{24}N_2O_2S$: C, 68.44; H, 6.56; N, 7.60. Found: C, 68.46; H, 6.87; N, 7.44.

EXAMPLE 3

2-decylamino-4,5-dianisylthiazole

A solution of 2.16 g. of decylthiourea and 3.35 g. of α-bromodesoxyanisoin in 50 ml. of ethanol was heated at reflux for 5 hours. The mixture was allowed to cool, treated wtih an equal volume of saturated aqueous sodium bicarbonate solution and the diluted with water, whereupon a solid separated. The precipitated solid was collected on a filter, dried and recrystallized twice from Skellysolve B hexanes to give 3.90 g. of 2-decylamino-4,5-dianisylthiazole of melting point 79–82° C.

Analysis.—Calcd. for $C_{27}H_{36}N_2O_2S$: C, 71.64; H, 8.02; N, 6.19. Found: C, 71.72; H, 8.27; N, 6.26.

EXAMPLE 4

2-allylamino-4,5-dianisylthiazole

A solution of 1.16 g. of allylthiourea and 3.35 g. of α-bromodesoxyanisoin in 100 ml. of ethanol was heated at reflux for a period of 4.5 hours. To this mixture was added 5 g. of solid sodium bicarbonate and the mixture was thereupon taken to dryness. The residue was suspended in water and the solid collected on a filter. The solid was then recrystallized twice from aqueous methanol to give 2.94 g. of 2-allylamino-4,5-dianisylthiazole of melting point 128–131° C.

EXAMPLE 5

2-(6-chlorobenzylamino)-4,5-dianisylthiazole

A solution of 2.01 g. of p-chlorobenzylthiourea and 3.35 g. of α-bromodesoxyanisoin in 50 ml. of acetonitrile was heated at reflux for a period of 2 hours. The mixture was then evaporated to dryness in vacuo and the resulting residue was dissolved in ether and aqueous sodium bicarbonate solution. The organic layer was washed with water and brine and taken to dryness. The residual solid was chromatographed over 300 ml. of Florisil (anhydrous magnesium silicate), the column being eluted with 300- ml. fractions consisting of 15% and 25% acetone, balance Skellysolve B hexanes. Those fractions yielding residues with a melting point above 180° C. were combined and recrystallized from acetonitrile to give 2.75 g. of 2-(p-chlorobenzylamino)-4,5-dianisylthiazole of melting point 182–185° C.

Analysis.—Calcd. for $C_{24}H_{21}ClN_2O_2S$: C, 65.97; H, 4.84; N, 6.41. Found: C, 66.07; H, 4.95; N, 6.44.

EXAMPLE 6

2-phenylamino-4,5-dianisylthiazole

A solution of 1.52 g. of phenylthiourea and 3.35 g. of α-bromodesoxyanisoin in 50 ml. of ethanol was heated at reflux for 2 hours. The hot mixture was then diluted with an equal volume of water which caused a solid to separate on cooling. This solid was recrystallized once from aqueous methanol to give 3.13 g. of 2-phenylamino-4,5-dianisylthiazole of melting point 175–178° C.

Analysis.—Calcd. for $C_{23}H_{20}N_2O_2S$: C, 71.11; H, 5.19; N, 7.21. Found: C, 70.88; H, 5.28; N, 6.93.

EXAMPLE 7

2-(p-methoxyphenylamino)-4,5-dianisylthiazole

A mixture of 1.82 g. of p-methoxyphenylthiourea and 3.35 g. of α-bromodesoxyanisoin in 50 ml. of ethanol was heated at reflux for 1.5 hours. The mixture was taken to dryness and the resulting residue was dissolved in methylene chloride. This solution was washed with aqueous sodium bicarbonate solution and brine and taken again to dryness. The residual solid was recrystallized twice from aqueous acetone to give 2.8 g. of 2-(p-methoxyphenylamino) - 4,5 - dianisylthiazole of melting point 182–185.5° C.

Analysis.—Calcd. for $C_{24}H_{22}N_2O_3S$: C, 68.87; H, 5.30; N, 6.70. Found: C, 68.74; H, 5.29; N, 6.59.

EXAMPLE 8

2-(p-carbethoxyphenylamino)-4,5-dianisylthiazole

A solution of 2.0 g. of p-carbethoxyphenylthiourea and 3.0 g. of α-bromodesoxyanisoin in 50 ml. of acetonitrile was heated at reflux temperature for a period of 1.5 hours. The mixture was taken to dryness and the resulting residue was twice recrystallized from aqueous ethanol to give 3.41 g. of 2-(p-carbethoxyphenylamino)-4,5-dianisylthiazole of melting point 144–148° C.

Analysis.—Calcd. for $C_{26}H_{24}N_2O_4S$: C, 67.81; H, 5.25; N, 6.08. Found: C, 68.08; H, 5.43; N, 6.04.

EXAMPLE 9

2-(p-carboxyphenylamino)-4,5-dianisylthiazole

A mixture of 1 g. of 2-(p-carbethoxyphenylamino)-4,5-dianisylthiazole and 2 ml. of 50% aqueous sodium hydroxide solution in 50 ml. of ethanol was heated at reflux for a period of 2 hours. The bulk of the solvent was thereupon removed in vacuo and the residue was dispersed in 500 ml. of water. The dispersion was washed with ether and the aqueous layer was acidified. The precipitated solid was collected by filtration and the product thus obtained was recrystallized from aqueous acetic acid. A total of 0.62 g. of 2(p-carboxyphenylamino)4,5-dianisylthiazole of melting point 278–282° C. (dec.) was obtained.

Analysis.—Calcd. for $C_{24}H_{20}N_2O_4S$: C, 66.65; H. 4.66; N, 6.48. Found: C, 66.61; H, 4.91; N, 6.53.

EXAMPLE 10

2-acetylamino-4,5-dianisylthiazole

To a solution of 2 g. of 2-amino-4,5-dianisylthiazole, in 50 ml. of tetrahydrofuran containing 1 ml. of pyridine, was added 0.51 g. of acetyl chloride. After standing at room temperature (about 25° C.) for 7 hours the mixture was distilled in vacuo to give a concentrate to which were added ether and aqueous sodium bicarbonate solution. The resulting solid was collected on a filter. This solid was recrystallized twice from aqueous methanol to give 0.96 g. of 2-acetylamino-4,5-dianisylthiazole of melting point 193–195° C.

Analysis.—Calcd. for $C_{19}H_{18}N_2O_3S$: C, 64.38; H, 5.12; N, 7.91. Found: C, 64.57; H, 5.38; N, 8.11.

EXAMPLE 11

2-benzoylamino-4,5-dianisylthiazole

Benzoyl chloride (0.9 g.) was added over a period of 10 minutes to a solution of 2.0 g. of 2-amino-4,5-dianisylthiazole in 1 ml. of pyridine and 50 ml. of tetrahydrofuran. At the end of 4 hours of standing, the mixture was diluted with ether and water. The organic layer was washed with water, followed by 3 portions of 50 ml. each of cold 2.5 N hydrochloric acid. The acid extracts were combined and basified with dilute sodium hydroxide solution to give 0.73 g. of recovered starting material, 2-amino-4,5-dianisylthiazole of melting point 208–210° C. The washed organic layer was taken to dryness and the residue was chromatographed over 200 ml.

of Florisil (anhydrous magnesium silicate). The column was eluted with 200-ml. fractions of 90% Skellysolve B hexanes and 10% acetone. The fractions which showed a single spot by thin layer chromatography, namely fractions 6–12, were combined and evaporated to give 1.56 g. of 2-benzoylamino-4,5-dianisylthiazole.

*Analysis.*—Calcd. for $C_{24}H_{20}N_2O_3S$: C, 69.21; H, 4.84; N, 6.73. Found: C, 69.46; H, 5.01; N, 6.43.

EXAMPLE 12

*2-(p-methoxybenzoylamino)-4,5-dianisylthiazole*

A solution of 2.0 g. of 2-amino-4,5-dianisylthiazole, 1.1 g. of anisoyl chloride and 1 ml. of pyridine in 50 ml. of tetrahydrofuran was allowed to stand overnight. The bulk of the solvent was then removed by distillation in vacuo and the residue was dissolved in ether and aqueous sodium bicarbonate solution. The organic layer was washed with water and brine and taken to dryness. The resulting residue was treated with a small amount of ether and the solid collected on a filter. The solid was 0.39 g. of crude starting material, namely 2-amino-4,5-dianisylthiazole. The filtrate was taken to dryness to give a gummy residue which was chromatographed over 200 ml. of Florisil (anhydrous magnesium silicate), using as eluant a mixture consisting of 85% Skellysolve B hexanes and 15% acetone, and collecting 200 ml. fractions. Those fractions which crystallized on trituration with methanol were combined and evaporated and thereupon twice recrystallized from methylene chloride-methanol to give 1.24 g. of 2-(p-methoxybenzoylamino)-4,5-dianisylthiazole as a methanol solvate; melting point 85–88 C. (effervescence).

*Analysis.*—Calcd. for $C_{24}H_{22}N_2O_3S \cdot \frac{1}{2}CH_3OH$: C, 67.71; H, 5.57; N, 6.49. Found: C, 67.20; H, 5.07; N, 6.52.

The above solvate was heated at 50° C. and 0.1 mm. pressure for 48 hours to obtain 2-(p-methoxybenzoylamino)-4,5-dianisylthiazole.

EXAMPLE 13

*2-methylamino-4,5-dianisylthiazole*

In the manner given in Example I, methylthiourea was reacted with α-bromodesoxyanisoin, in ethanol at reflux temperature, to give 2-methylamino-4,5-dianisylthiazole.

EXAMPLE 14

*2-ethylamino-4,5-dianisylthiazole*

In the manner given in Example 1, ethylthiourea was reacted with α-bromodesoxyanisoin, in ethanol at reflux temperature, to give 2-ethylamino-4,5-dianisylthiazole.

EXAMPLE 15

*2-propylamino-4,5-dianisylthiazole*

In the manner given in Example 1, propylthiourea was reacted with α-bromodesoxyanisoin, in ethanol at reflux temperature, to give 2-propylamino-4,5-dianisylthiazole.

EXAMPLE 16

*2-pentylamino-4,5-dianisylthiazole*

In the manner given in Example 1, pentylthiourea was reacted with α-bromodesoxyanisoin, in ethanol at reflux temperature, to give 2-pentylamino-4,5-dianisylthiazole.

EXAMPLE 17

*2-hexylamino-4,5-dianisylthiazole*

In the manner given in Example 1, hexylthiourea was reacted with α-bromodesoxyanisoin, in ethanol at reflux temperature, to give 2-hexylamino-4,5-dianisylthiazole.

EXAMPLE 18

*2-octylamino-4,5-dianisylthiazole*

In the manner given in Example 1, octylthiourea was reacted with α-bromodesoxyanisoin, in ethanol at reflux temperature, to give 2-octylamino-4,5-dianisylthiazole.

EXAMPLE 19

*2-(2-hexenyl)amino-4,5-dianisylthiazole*

In the manner given in Example 1, (2-hexenyl)thiourea was reacted with α-bromodesoxyanisoin, in ethanol at reflux temperature, to give 2-(2-hexenyl)amino-4,5-dianisylthiazole.

EXAMPLE 20

*2-methallylamino-4,5-dianisylthiazole*

In the manner given in Example 1, methallylthiourea was reacted with α-bromodesoxyanisoin, in ethanol at reflux temperature, to give 2-methallylamino-4,5-dianisylthiazole.

EXAMPLE 21

*2-crotylamino-4,5-dianisylthiazole*

In the manner given in Example 1, crotylthiourea was reacted with α-bromodesoxyanisoin, in ethanol at reflux temperature, to give 2-crotylamino-4,5-dianisylthiazole.

EXAMPLE 22

*2-isopropylamino-4,5-dianisylthiazole*

In the manner given in Example 1, isopropylthiourea was reacted with α-bromodesoxyanisoin, in ethanol at reflux temperature, to give 2-isopropylamino-4,5-dianisylthiazole.

EXAMPLE 23

*2-(2-methyl-2-butenyl)amino-4,5-dianisylthiazole*

In the manner given in Example 1, (2-methyl-2-butenyl) thiourea was reacted with α-bromodesoxyanisoin, in ethanol at reflux temperature, to give 2-(2-methyl-2-butenyl) amino-4,5-dianisylthiazole.

EXAMPLE 24

*2-(p-bromobenzylamino)-4,5-dianisylthiazole*

In the manner given in Example 1, p-bromobenzylthiourea was reacted with α-bromodesoxyanisoin, in ethanol at reflux temperature, to give 2-(p-bromobenzylamino)-4,5-dianisylthiazole.

EXAMPLE 25

*2-(p-fluorobenzlamino)-4,5-dianisylthiazole*

In the manner given in Example 1, p-fluorobenzylthiourea was reacted with α-bromodesoxyanisoin, in ethanol at reflux temperature, to give 2-(p-fluorobenzylamino)-4,5-dianisylthiazole.

EXAMPLE 26

*2-(m-iodobenzylamino)-4,5-diansylthiazole*

In the manner given in Example 1, m-iodobenzylthiourea was reacted with α-bromodesoxyanisoin, in ethanol at reflux temperature, to give 2-(m-iodobenzylamino)-4,5-dianisylthiazole.

EXAMPLE 27

*2-(o-chlorobenzylamino)-4,5-dianisylthiazole*

In the manner given in Example 1, o-chlorobenzylthiourea was reacted with α-bromodesoxyanisoin, in ethanol at reflux temperature, to give 2-(o-chlorobenzylamino)-4,5-dianisylthiazole.

EXAMPLE 28

*2-(m-ethoxybenzylamino)-4,5-dianisylthiazole*

In the manner given in Example 1, m-ethoxybenzylthiourea was reacted with α-bromodesoxyanisoin, in ethanol at reflux temperature, to give 2-(m-ethoxybenzylamino)-4,5-dianisylthiazole.

EXAMPLE 29

*2-(p-propoxybenzylamino)-4,5-dianisylthiazole*

In the manner given in Example 1, p-propoxybenzylthiourea was reacted with α-bromodesoxyanisoin, in ethanol at reflux temperature, to give 2-(p-propoxybenzylamino)-4,5-dianisylthiazole.

EXAMPLE 30

*2-(p-fluorophenylamino)-4,5-dianisylthiazole*

In the manner given in Example 1, p-fluorophenylthiourea was reacted with α-bromodesoxyanisoin, in ethanol at reflux temperature, to give 2-(p-fluorophenylamino)-4,5-dianisylthiazole.

EXAMPLE 31

*2-(o-bromophenylamino)-4,5-dianisylthiazole*

In the manner given in Example 1, o-bromophenylthiourea was reacted with α-bromodesoxyanisoin, in ethanol at reflux temperature, to give 2-(o-bromophenylamino)-4,5-dianisylthiazole.

EXAMPLE 32

*2-(p-carbopropoxyphenylamino)-4,5-dianisylthiazole*

In the manner given in Example 1, p-carbopropoxyphenylthiourea was reacted with α-bromodesoxyanisoin, in ethanol at reflux temperature, to give 2-(p-carbopropoxyphenylamino)-4,5-dianisylthiazole.

In the manner given in Example 1, other 2-substituted-4,5-dianisylthiazoles are obtained by reacting a selected substituted thiourea with α-bromodesoxyanisoin, preferably in solution and at the temperature of reflux of the reaction mixture. Representative compounds, thus obtained, include: 2-heptylamino-4,5-dianisylthiazole, 2-nonylamino-4,5-dianisylthiazole, 2-isobutylamino-4,5-dianisylthiazole, 2-(2-ethylallylamino)-4,5-dianisylthiazole, 2-(o-fluorobenzylamino)-4,5-dianisylthiazole, 2-(o-iodobenzylamino)-4,5-dianisylthiazole, 2-(o-methoxybenzylamino)-4,5-dianisylthiazole, 2-(m-propoxybenzylamino)-4,5-dianisylthiazole, 2-benzylamino-4,5-dianisylthiazole, 2-(m-ethoxyphenylamino)-4,5-dianisylthiazole, 2-(o-carbomethoxyphenylamino)-4,5-dianisylthiazole, 2-(m-carbopropoxyphenylamino)-4,5-dianisylthiazole, 2-(p-methylphenylamino)-4,5-dianisylthiazole, 2 - (o - propylphenylamino)-4,5-dianisylthiazole, 2-(m-methylbenzylamino)-4,5-dianisylthiazole, 2 - (p - isopropylbenzylamino)-4,5-dianisylthiazole and the like.

EXAMPLE 33

*2-undecanoylamino-4,5-dianisylthiazole*

In the manner given in Example 10, 2-amino-4,5-dianisylthiazole was reacted with undecanoyl chloride to give 2-undecanoyl-amino-4,5-dianisylthiazole.

EXAMPLE 34

*2-octanoylamino-4,5-dianisylthiazole*

In the manner given in Example 10, 2-amino-4,5-dianisylthiazole was reacted with octanoyl chloride to give 2-actanoylamino-4,5-dianisylthiazole.

EXAMPLE 35

*2-valerylamino-4,5-dianisylthiazole*

In the manner given in Example 10, 2-amino-4,5-dianisylthiazole was reacted with valeryl chloride to give 2-valerylamino-4,5-dianisylthiazole.

EXAMPLE 36

*2-(o-chlorobenzoyl)-4,5-dianisylthiazole*

In the manner given in Example 10, 2-amino-4,5-dianisylthiazole was reacted with o-chlorobenzoyl chloride to give 2-(o-chlorobenzoylamino)-4,5-dianisylthiazole.

EXAMPLE 37

*2-(p-ethylbenzoylamino)-4,5-dianisylthiazole*

In the manner given in Example 10, 2-amino-4,5-dianisylthiazole was reacted with p-ethylbenzoyl chloride to give 2-(p-ethylbenzoylamino)-4,5-dianisylthiazole.

EXAMPLE 38

*2-(p-fluorobenzoylamino)-4,5-dianisylthiazole*

In the manner given in Example 10, 2-amino-4,5-dianisylthiazole was reacted with p-fluorobenzoyl chloride to give 2-(p-fluorobenzoylamino)-4,5-dianisylthiazole.

EXAMPLE 39

*2-isobutyrylamino-4,5-dianisylthiazole*

In the manner given in Example 10, 2-amino-4,5-dianisylthiazole was reacted with isobutyryl chloride to give 2-isobutyrylamino-4,5-dianisylthiazole.

EXAMPLE 40

*2-(p-carbethoxybenzoylamino)-4,5-dianisylthiazole*

In the manner given in Example 10, 2-amino-4,5-dianisylthiazole was reacted with p-carbethoxybenzoyl chloride to give 2-(p-carbethoxybenzoylamino)-4,5-dianisylthiazole.

In the manner given in Example 10, other 2-acylamino-4,5-dianisylthiazoles can be obtained by reacting 2-amino-4,5-dianisylthiazole with a selected acyl bromide or chloride, or an anhydride of an organic carboxylic acid, particularly of an alkanoic acid having from 2 to 11 carbon atoms, inclusive, or of a benzoic acid or substituted benzoic acid. Representative compounds thus obtained include: 2-propionylamino-4,5-dianisylthiazole, 2-butyrylamino-4,5-dianisylthiazole, 2-hexanoylamino-4,5-dianisylthiazole, 2-heptanoylamino-4,5-dianisylthiazole, 2-nonanoylamino-4,5-dianisylthiazole, 2-decanoylamino-4,5-dianisylthiazole, 2-(m-iodobenzoylamino)-4,5-dianisylthiazole, 2-(o-ethylbenzoylamino)-4,5-dianisylthiazole, 2-(p-propoxybenzoylamino)-4,5-dianisylthiazole, 2 - (p - isopropoxybenzoylamino)-4,5-dianisylthiazole, 2-(m-isopropylbenzoylamino)-4,5-dianisylthiazole, 2-(o-bromobenzoylamino)-4,5-dianisylthiazole, and the like.

EXAMPLE 41

*2-methyl-4,5-dianisylthiazole*

A mixture of 1.62 g. of thioacetamide and 7.25 g. of α-bromodesoxyanisoin in 100 ml. of acetonitrole was heated at reflux temperature for a period of 2 hours. The reaction mixture was evaporated in vacuo to give a residue which was shaken with a mixture of ether and aqueous sodium bicarbonate solution. The organic layer was separated, washed with water and brine and evaporated to dryness. The solid which remained was recrystallized from Skellysolve B hexanes to give 6.17 g. of 2-methyl-4,5-dianisylthiazole of melting point 75–79° C. Another recrystallization from Skellysolve B hexanes gave pure 2-methyl-4,5-dianisylthiazole of melting point 77.5–80° C.

*Analysis.*—Calcd. for $C_{18}H_{17}NO_2S$: C, 69.42; H, 5.50; N, 4.50. Found: C, 69.03; H, 5.50; N, 4.22.

EXAMPLE 42

*2-ethyl-4,5-dianisylthiazole*

In the manner given in Example 41, thiopropionamide and α-bromodesoxyanisoin were reacted to give 2-ethyl-4,5-dianisylthiazole.

EXAMPLE 43

*2-propyl-4,5-dianisylthiazole*

In the manner given in Example 41, thiobutyramide and α-bromodesoxyanisoin were reacted to give 2-propyl-4,5-dianisylthiazole.

EXAMPLE 44

*2-butyl-4,5-dianisylthiazole*

In the manner given in Example 41, thiovaleramide and α-bromodesoxyanisoin were reacted to give 2-butyl-4,5-dianisylthiazole.

Example 45

2-benzyl-4,5-dianisylthiazole

In the manner given in Example 41, thiophenylacetamide and α-bromodesoxyanisoin were reacted to give 2-benzyl-4,5-dianisylthiazole.

Example 46

Methyl 4,5-dianisyl-2-thiazoleacetate

A solution of 2 g. of 2-methyl-4,5-dianisylthiazole in 50 ml. of tetrahydrofuran was cooled in an acetone-solid carbon dioxide bath. To this solution was added 4.3 ml. of 1.49 N butyllithium in pentane. The red mixture was stirred for a period of 10 minutes in a nitrogen atmosphere and transferred under nitrogen pressure to a prepared slush consisting of 100 ml. of powdered solid carbon dioxide and 20 ml. of tetrahydrofuran. The carbon dioxide was allowed to evaporate and the mixture taken to dryness. The solid residue was suspended in ether and the solid collected on a filter. The solid (lithium 4,5-dianisyl-2-thiazoleacetate) was dissolved in ice water and the solution was made acidic with 64 ml. of 0.1 N hydrochloric acid (with cooling). The mixture was then quickly extracted with ether. The ether layer was separated, washed with cold water and brine and percolated through sodium sulfate. This solution, containing 4,5-dianisyl-2-thiazoleacetic acid, was treated with ethereal diazomethane (prepared from 5 g. of N-nitro-N-nitroso-methylguanidine), then allowed to stand for 10 minutes and evaporated to dryness to give an oily residue. This residue was chromatographed over 200 ml. of Florisil, taking 200-ml. fractions with an eluant consisting of 95% Skellysolve B hexanes and 5% acetone. Fractions 9 to 22 were combined and recrystallized twice from ether-Skellysolve B hexanes to give 1.20 g. of methyl 4,5-dianisyl-2-thiazoleacetate of melting point 66–70 C.

*Analysis.*—Calcd. for $C_{20}H_{19}NO_4S$: C, 65.02; H, 5.18; N, 3.79. Found: C, 65.01; H, 5.62; N, 3.92.

Example 47

Ethyl 4,5-dianisyl-2-thiazoleacetate

In the manner given in Example 46, 4,5-dianisyl-2-thiazoleacetic acid was reacted with diazoethane to give ethyl 4,5-dianisyl-2-thiazoleacetate.

Example 48

Methyl 4,5-dianisyl-α-methyl-2-thiazoleacetate

In the manner given in Example 46, a solution of 2-ethyl-4,5-dianisylthiazole was treated with butyllithium in pentane to give 2-(1-lithiumethyl)-4,5-dianisylthiazole; this compound was treated with carbon dioxide to obtain 4,5-dianisyl-α-methyl-2-thiazoleacetic acid; and, this acid was treated with diazomethane to obtain methyl 4,5-dianisyl-α-methyl-2-thiazoleacetate.

Example 49

Methyl 4,5-dianisyl-α-ethyl-2-thiazoleacetate

In the manner given in Example 46, a solution of 2-propyl-4,5-dianisylthiazole was treated with butyllithium in pentane to give 2-(1-lithiumpropyl)-4,5-dianisylthiazole; this compound was treated with carbon dioxide to obtain 4,5-dianisyl-α-ethyl-2-thiazoleacetic acid; and, this acid was treated with diazomethane to obtain methyl 4,5-dianisyl-α-ethyl-2-thiazoleacetate.

Example 50

Ethyl 4,5-dianisyl-α-propyl-2-thiazoleacetate

In the manner given in Example 46, a solution of 2-butyl-4,5-dianisylthiazole was treated with butyllithium in pentane to give 2-(1-lithiumbutyl)-4,5-dianisylthiazole; this compound was treated with carbon dioxide to give 4,5-dianisyl-α-propyl-2-thiazoleactic acid; and, this acid was treated with diazoethane to give ethyl 4,5-dianisyl-α-propyl-2-thiazoleacetate.

Example 51

Methyl 4,5-dianisyl-α-phenyl-2-thiazoleacetate

In the manner given in Example 46, a solution of 2-benzyl-4,5-dianisylthiazole was treated with butyllithium in pentane to give 2-(α-lithiumbenzyl)-4,5-dianisylthiazole; this compound was treated with carbon dioxide to obtain 4,5-dianisyl-α-phenyl-2-thiazoleacetic acid; and this acid was treated with diazomethane to give methyl 4,5-dianisyl-α-phenyl-2-thiazoleacetate.

I claim:

1. A 2-substituted-4,5-dianisylthiazole of the formula:

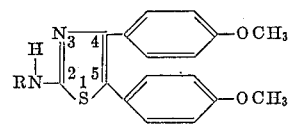

III wherein R is selected from the group consisting of hydrogen; alkyl having from 1 to 10 carbon atoms, inclusive; lower alkenyl having from 3 to 6 carbon atoms, inclusive; phenyl of the formula:

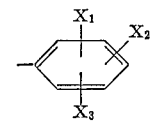

in which $X_1$, $X_2$ and $X_3$ are substituents selected from the group consisting of hydrogen, halogen, alkyl and alkoxy having from 1 to 3 carbon atoms, inclusive, carboxy, and carbalkoxy having from 2 to 4 carbon atoms, inclusive; benzyl in which the phenyl group is defined as above; and acyl of the formula R'CO— in which R' is selected from the group consisting of alkyl having from 1 to 10 carbon atoms, inclusive, and phenyl defined as above.

2. 2-amino-4,5-dianisylthiazole.
3. 2-butylamino-4,5-dianisylthiazole.
4. 2-decylamino-4,5-dianisylthiazole.
5. 2-allylamino-4,5-dianisylthiazole.
6. 2-(p-chlorobenzylamino)-4,5-dianisylthiazole.
7. 2-phenylamino-4,5-dianisylthiazole.
8. 2-(p-methoxyphenylamino)-4,5-dianisylthiazole.
9. 2-(p-carbethoxyphenylamino)-4,5-dianisylthiazole.
10. 2-(p-carboxyphenylamino)-4,5-dianisylthiazole.
11. 2-acetylamino-4,5-dianisylthiazole.
12. 2-benzoylamino-4,5-dianisylthiazole.
13. 2-(p-methoxybenzoylamino)-4,5-dianisylthiazole.

References Cited

UNITED STATES PATENTS 2,639,285    5/1953    Sonogrn et al. _____ 260—306.8

ALEX MAZEL, Primary Examiner

R. J. GALLAGHER, Assistant Examiner

U.S. Cl. X.R.

260—302, 999

UNITED STATES PATENT OFFICE
CERTIFICATE OF CORRECTION

Patent No. 3,458,526   Dated July 29, 1969

Inventor(s) Daniel Lednicer

It is certified that error appears in the above-identified patent and that said Letters Patent are hereby corrected as shown below:

Column 4, line 28, for "diseasees" read -- diseases --; line 44, for "ehtyl" read -- ethyl --. Column 7, line 11, for "solid crystallized" read -- solid was crystallized --; line 23, for "treated wtih" read -- treated with --; line 24, for "and the diluted" read -- and then diluted --; line 45 for "2-(6-" read -- 2-(p- --. Column 8, line 41, for "2(p-carboxyphenylamino)4,5-" read -- 2-(p-carboxyphenylamino)-4,5- --. Column 9, line 41, for "Example I" read -- Example 1 --. Column 10, line 50, for "diansyl" read -- dianisyl --. Column 11, line 39, for "phenylamino-4,5" read -- phenylamino)-4,5 --; line 55, for "2-actanoyl" read -- 2-octanoyl --. Column 12, line 43, for "acetonitrole" read -- acetonitrile --. Column 14, line 3, for "2-thiazoleactic" read -- 2-thiazoleacetic --.

SIGNED AND SEALED
JAN 26 1971

(SEAL)
Attest:

Edward M. Fletcher, Jr.
Attesting Officer

WILLIAM E. SCHUYLER, JR.
Commissioner of Patents